Figure 1:
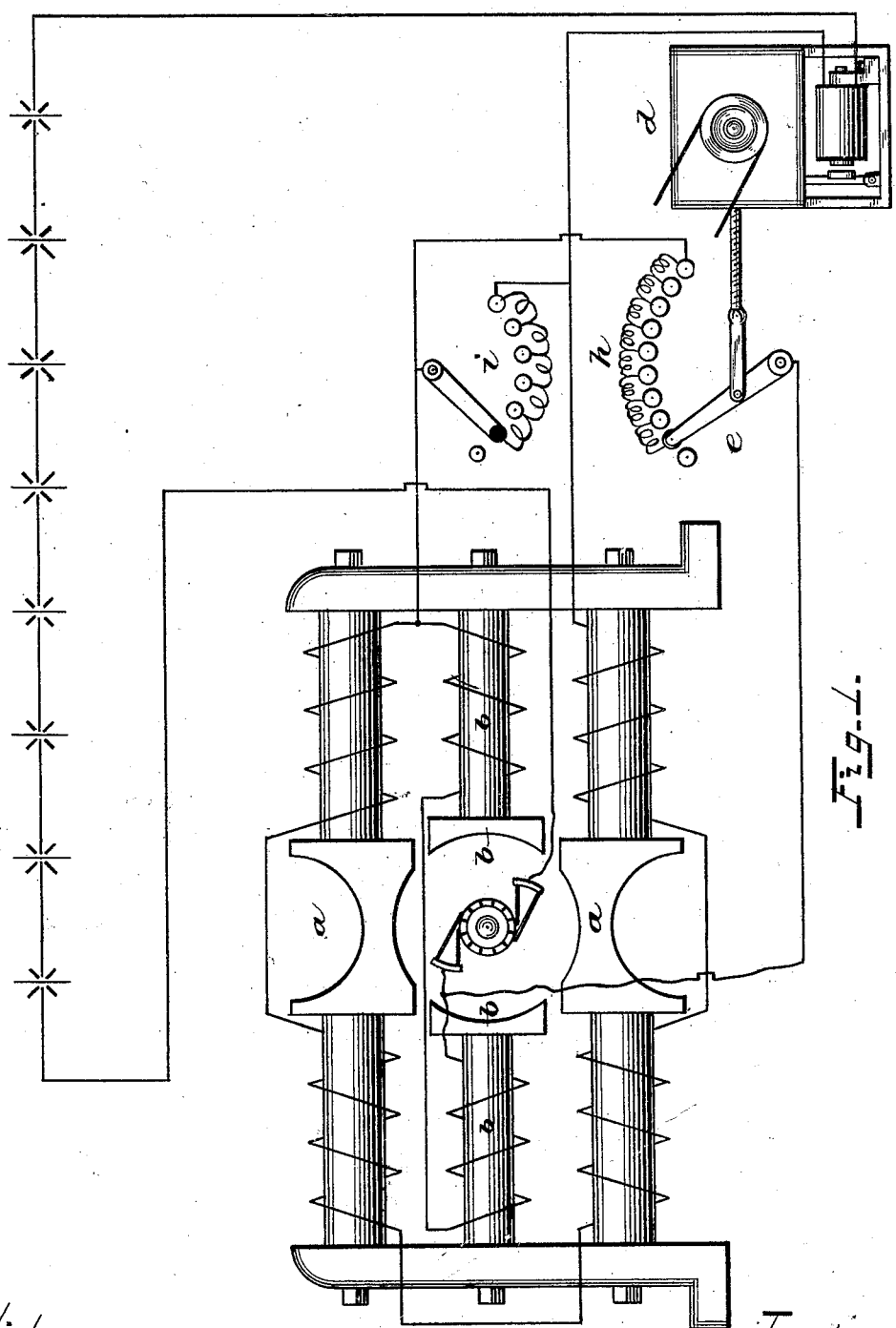

(No Model.) 2 Sheets—Sheet 1.
C. E. SCRIBNER.
REGULATOR FOR DYNAMO ELECTRIC MACHINES.

No. 509,955. Patented Dec. 5, 1893.

Witnesses.
C. G. Hawley.
Geo. R. Parker.

Inventor.
Charles E. Scribner
By ........
Attorney.

(No Model.)
2 Sheets—Sheet 2.

C. E. SCRIBNER.
REGULATOR FOR DYNAMO ELECTRIC MACHINES.

No. 509,955.
Patented Dec. 5, 1893.

Witnesses.
C. G. Hawley.
Geo. R. Parker.

Inventor.
Charles E. Scribner
By George P. Barton
Attorney.

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

REGULATOR FOR DYNAMO-ELECTRIC MACHINES.

SPECIFICATION forming part of Letters Patent No. 509,955, dated December 5, 1893.

Application filed June 1, 1889. Serial No. 312,925. (No model.)

*To all whom it may concern:*

Be it known that I, CHARLES E. SCRIBNER, a citizen of the United States, residing at Chicago, in the county of Cook and State of Illinois, have invented a certain new and useful Improvement in Apparatus for Preventing Sparking in Dynamo-Electric Machines, (Case No. 201,) of which the following is a full, clear, concise, and exact description, reference being had to the accompanying drawings, forming a part of this specification.

My invention relates to dyamo electric machines in which the different coils or different portions of the armature are short circuited one after another. During the time of this short circuiting the current changes from one polarity to the other. Each coil is short circuited at particular positions with reference to the brushes and field twice during each revolution of the armature. Thus looking at the machine at any particular point in its rotation there will be two coils or portions of the armature which will be short circuited. It is while thus short circuited that the current changes from one direction to the other. Suppose the time of short circuiting to be a three hundred and sixty-second part of a second the current in the coil during this time goes to zero and then builds up in the opposite direction to a certain extent; the amount that it builds up depends upon the force of the field in which it is moving. The current which is built up is in the direction of the current in the circuit containing the brush or brushes and I have discovered that in order to prevent sparking or arcing at the brushes the current should build up to be of the same strength as that in the circuit into which the coil is moving. I have also discovered that the field of force of the short circuited coil must have a particular strength so as to cause the current which is built up in the short circuited coil to be equal to the current in the circuit into which the short circuited coil is introduced when the short circuit is removed. Assume the machine to be giving forth say a twenty ampere current; the current then of the generating coils on the opposite sides of the armature would be ten each; the field then of the coils as they are short circuited one after another must be of sufficient strength to cause a current of ten ampères to be built up in each coil at the time each coil is introduced into the circuit after being short circuited.

I am aware that prior to my invention dynamos have been constructed in which more than two field magnet pole pieces were provided and in which the different pole pieces were adjustable in strength with relation to each other, but in none of these prior inventions was provision made for maintaining a practically constant field of force to be cut by the short circuited coils of the armature while the other portions of the field of force acting upon the current giving coils were variable.

My invention therefore, speaking generally, consists in apparatus for maintaining under given conditions a practically constant field for the short circuited coils, the strength of said field being such that the current built up will be equal to the current in the circuit into which the short circuited coil is introduced at the moment the short circuit is removed. In this manner arcing or sparking at the brushes is practically prevented.

In carrying out my invention I provide preferably two sets of field magnets, the poles of which are arranged about the revolving armature on different sides thereof; two of these poles are designed to remain practically constant as long as the current taken off from the machine is constant. The other poles are designed especially for affording a field of force for the coils which are generating and giving off the current, and consequently the force of this field should vary as the resistance of the circuit varies so as to maintain constant current strength as is necessary in arc lighting. Speaking generally, then, it may be said that we have a constant field of force for the short circuited coils and a variable field of force for the other coils, that is, the coils which are generating and giving off the current.

Figure 2:
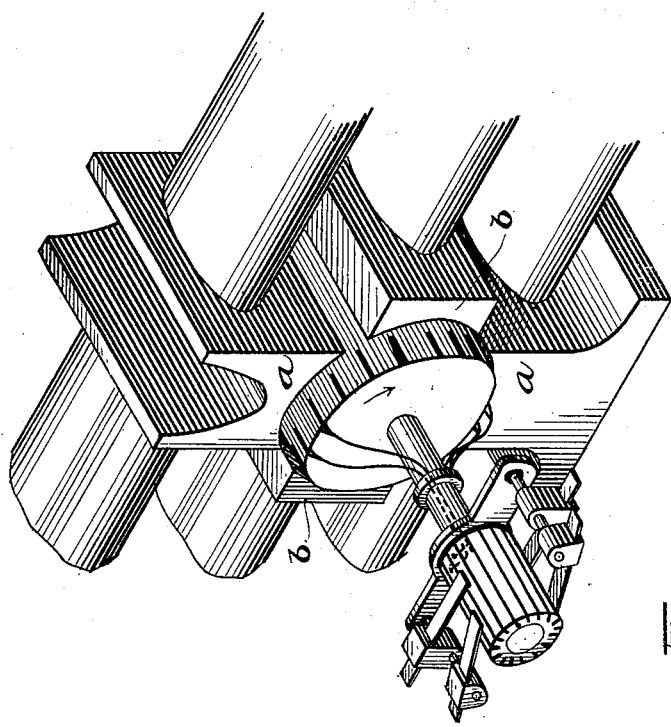

In the drawings which are illustrative of my invention—Figure 1 is a diagram of a lamp circuit including a dynamo electric machine provided with special field magnets for influencing the short circuited coils in connection with a regulator for controlling the current strength and a rheostat and hand switch for shunting more or less of the current from the coils which control the field of the short circuited coils. Fig. 2 is an isometric view of the commutator of the machine and the end of the armature with the poles in proper relation thereto.

Like parts are indicated by similar letters of reference throughout the different figures.

Referring now to Fig. 1 the consequent poles $a$ may be considered as causing the field of force for the short circuited coils. The poles $b$ may be considered as causing the field of force for the current producing coils.

The regulator $d$ shown in Fig. 1 may be of any well known construction. I have for convenience shown the form which is described and claimed in my application, Serial No. 194,396, (Case No. 102,) filed March 6, 1886. This regulator has its electro magnet in the main circuit and is connected with the pivoted contact piece $e$ and so arranged that in response to changes in the current strength of the lamp circuit more or less of the resistance of the rheostat $h$ is brought into the shunt circuit around the coils of the field magnets which cause the field of force of the current giving coils. In this manner the current in the lamp circuit is maintained practically constant notwithstanding changes in the amount of work which is being done. The regulator has a normal adjustment which may be to maintain a twenty ampère current or a ten ampère current. We will suppose that it is desired to change from a low tension twenty ampère system to a high tension ten ampère system. This change can be effected by simply changing the adjustment of the regulator in a well known way. This change having been effected the divided current through the different sides of the current giving coils will be five ampères each instead of ten ampères each as is the case when the main current is twenty ampères. It is now necessary to reduce the field of force of the short circuited coils. This is done by means of the rheostat $i$ which is included in a shunt around the coils of the magnets causing the constant field for the short circuited coils. By reducing the resistance of this shunt sufficiently it is evident that the field of force of the short circuited coils will be reduced accordingly so that the current built up in said coils will be five ampères instead of ten at the moment the short circuit is removed as in the previous case.

By my apparatus as thus described it will be seen that the field of force which effects the short circuited coils is maintained of such strength that the current built up in the short circuited coils will be equal to the current in the current producing coils at the time the short circuited coils are introduced into and become a part of the current producing coils. Moreover, in case it is desired to change the normal current of the machine an adjustment may be made accordingly of the strength of the field of force so that in any event sparking at the commutator will be prevented.

Having thus described my invention, I claim as new and desire to secure by Letters Patent—

1. The combination in a dynamo electric machine of magnets adapted to produce a constant field, said constant field being cut by the coils of the armature in succession at the moment each coil is short circuited, said field influencing said coils until the short circuit is removed, other magnets adapted to produce a field which is cut by the active coils, that is the current producing coils, of the same armature, an electro magnet connected with the circuit of the dynamo, which electro-magnet controls the strength of the field cut by the said active coils; whereby the current of the dynamo may be maintained practically constant and the brushes kept free from spark.

2. The combination in a dynamo electric machine of two sets of field magnets, a closed coil revolving armature therefor having several armature coils connected with segments of the commutator, contact brushes each bearing upon the commutator segments constituting the terminals of one armature coil to short circuit the same, one set of the field magnets being connected in an electric circuit including a rheostat for varying the current therein in response to changes in the strength of the current generated by the armature, said field producing a magnetic field in position to be cut by those coils of the armature which are not short circuited, the remaining set of fields being of a constant strength and producing magnetic lines of force in position to be cut by the short circuited coils of the armature, substantially as described.

In witness whereof I hereunto subsribe my name this 15th day of May, A. D. 1889.

CHARLES E. SCRIBNER.

Witnesses:
ELLA EDLER,
GEORGE P. BARTON.